United States Patent
Kaplan et al.

(10) Patent No.: US 10,496,664 B2
(45) Date of Patent: Dec. 3, 2019

(54) FAST RETRIEVAL OF RELATED DATA PARTITIONED ACROSS A DISTRIBUTED KEY-VALUE STORE

(71) Applicant: Microsoft Technology Licensing, LLC, Redmond, WA (US)

(72) Inventors: Shai Kaplan, Tel Aviv (IL); Yaniv Joseph Oliver, Givatayim (IL); Noam Liran, Yafo (IL); Ido Yehiel Preizler, Kiryat Ono (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 358 days.

(21) Appl. No.: 15/475,857

(22) Filed: Mar. 31, 2017

(65) Prior Publication Data

US 2018/0285427 A1   Oct. 4, 2018

(51) Int. Cl.
  *G06F 17/30*   (2006.01)
  *G06F 16/248*  (2019.01)
  *H04L 29/08*   (2006.01)
  *G06F 16/28*   (2019.01)
  *G06F 16/22*   (2019.01)

(52) U.S. Cl.
  CPC ........ *G06F 16/248* (2019.01); *G06F 16/2255* (2019.01); *G06F 16/285* (2019.01); *H04L 67/1097* (2013.01)

(58) Field of Classification Search
  CPC .. G06F 16/248; G06F 16/285; G06F 16/2255; H04L 67/1096
  USPC ................................................. 707/600–899
  See application file for complete search history.

(56) References Cited

U.S. PATENT DOCUMENTS

| 6,212,525 | B1  | 4/2001 | Guha |
| 7,788,240 | B2  | 8/2010 | Rossmann |
| 9,239,852 | B1  | 1/2016 | Lutz et al. |
| 9,384,145 | B2  | 7/2016 | Gura et al. |
| 9,600,501 | B1* | 3/2017 | Fuller ..................... G06F 16/27 |
| 2008/0097971 | A1 | 4/2008 | Chen et al. |
| 2010/0146004 | A1 | 6/2010 | Sim-tang |

(Continued)

OTHER PUBLICATIONS

Escriva, et al., "HyperDex: A Distributed, Searchable Key-Value Store", In Proceedings of the ACM SIGCOMM conference on Applications, technologies, architectures, and protocols for computer communication, Aug. 13, 2012, 12 pages.

(Continued)

*Primary Examiner* — Isaac M Woo
(74) *Attorney, Agent, or Firm* — Workman Nydegger

(57) ABSTRACT

A device configured to operate in a distributed network system includes a key-value processing system to generate at least one of a first request and a second request. The first request is to retrieve a selected one of a plurality of sub-groups of data. The first request includes a plurality of keys each including a first value identifying the selected one of the plurality of sub-groups and a respective one of a plurality of second values. Each of the second values identifies a respective subset of data within the selected one of the plurality of sub-groups. The second request is to retrieve a selected one of the subsets of data within the selected one of the plurality of sub-groups and includes a key. The key includes the first value and a selected one of the second values, and the selected one of the second values corresponds to a hash value.

19 Claims, 5 Drawing Sheets

(56) References Cited

U.S. PATENT DOCUMENTS

2014/0172898 A1     6/2014   Aguilera et al.
2015/0379009 A1    12/2015   Reddy et al.
2018/0285441 A1    10/2018   Kaplan et al.

OTHER PUBLICATIONS

Garg, Prachi, "Apache Ignite: Distributed In-Memory Key-Value Store", https://dzone.com/articles/apache-ignite-distributed-in-memory-key-value-stor, Published on: Jan. 27, 2016, 5 pages.

Vogels, Werner, "Taking DynamoDB beyond Key-Value: Now with Faster, More Flexible, More Powerful Query Capabilities", http://www.allthingsdistributed.com/2013/12/dynamodb-global-secondary-indexes.html, Published on: Dec. 12, 2013, 5 pages.

Decandia, et al., "Dynamo: Amazon's Highly Available Key-value Store", In Proceedings of twenty-first ACM SIGOPS symposium on Operating systems principles, Oct. 14, 2007, pp. 205-220.

Castro-Castilla, Alvaro, "Building a Distributed Fault-Tolerant Key-Value Store", http://blog.fourthbit.com/2015/04/12/building-a-distributed-fault-tolerant-key-value-store, Published on: Apr. 12, 2015, 11 pages.

Goossaert, Emmanuel, "Implementing a Key-Value Store—Part 5: Hash table implementations", http://codecapsule.com/2013/05/13/implementing-a-key-value-store-part-5-hash-table-implementations/, Published on: May 13, 2013, 15 pages.

Lu, et al., "WiscKey: Separating Keys from Values in SSD-conscious Storage", In Proceedings of the 14th USENIX Conference on File and Storage Technologies, Feb. 22, 2016, pp. 133-148.

"Non Final Office Action Issued in U.S. Appl. No. 15/475,720", dated Apr. 18, 2019, 8 Pages.

* cited by examiner

FAST RETRIEVAL OF RELATED DATA PARTITIONED ACROSS A DISTRIBUTED KEY-VALUE STORE

CROSS-REFERENCE TO RELATED APPLICATIONS

The present application is related to U.S. patent application Ser. No. 15/475,720 filed on Mar. 31, 2017. The entire disclosure of the application referenced above is incorporated by reference.

FIELD

The present disclosure relates to key-value lookup systems and methods for a distributed data storage system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Network systems may implement distributed data storage for storing application data, user data, etc. The data storage is accessible (e.g., either directly or indirectly) to a large number of clients, including tenants (e.g., customers) and individual users associated with respective tenants. Clients query a server to retrieve specific data from the distributed data storage. In some examples, queries are executed according to a protocol such as standard query language (SQL), NoSQL, etc.

Some distributed data storage systems implement a key-value database. In a key-value database, a key-value cluster includes one or more key-value servers or nodes storing respective data. Accordingly, data is distributed across multiple key-value servers. Clients transmit a request for data that includes a key mapped to one or more values representing specific data. A key-value cluster receives the request and retrieves the data from the appropriate key-value server based on the included key. For example, the key-value cluster may implement a key-value table that stores key-value pairs to enable retrieval of data (i.e., the value) paired with respective key.

SUMMARY

A device configured to operate in a distributed network system includes a key-value processing system to selectively generate at least one of a first request and a second request. The first request is to retrieve, from a storage cluster, a selected one of a plurality of sub-groups of data. The first request includes a plurality of keys, each of the plurality of keys including a first value identifying the selected one of the plurality of sub-groups and a respective one of a plurality of second values. Each of the plurality of second values identifies a respective subset of data within the selected one of the plurality of sub-groups. The second request is to retrieve, from the storage cluster, a selected one of the subsets of data within the selected one of the plurality of sub-groups of data. The second request includes a key. The key includes the first value and a selected one of the second values, and the selected one of the second values corresponds to a hash value. The device includes a network interface to transmit the at least one of the first request and the second request and receive at least one of the selected one of the plurality of sub-groups of data and the selected one of the subsets of data.

A method for operating a device in a distributed network system includes selectively generating, using the device, at least one of a first request and a second request. The first request is to retrieve, from a storage cluster, a selected one of a plurality of sub-groups of data. The first request includes a plurality of keys, each of the plurality of keys including a first value identifying the selected one of the plurality of sub-groups and a respective one of a plurality of second values, each of the plurality of second values identifying a respective subset of data within the selected one of the plurality of sub-groups. The second request is to retrieve, from the storage cluster, a selected one of the subsets of data within the selected one of the plurality of sub-groups of data. The second request includes a key including the first value and a selected one of the second values, and the selected one of the second values corresponds to a hash value. The method further includes transmitting the at least one of the first request and the second request from the device and receiving, at the device, at least one of the selected one of the plurality of sub-groups of data and the selected one of the subsets of data.

A key-value processing system for a device in a distributed network system includes a processor and a tangible machine readable medium. The machine readable medium stores machine readable instructions that, when executed by the processor, configure the key-value processing system to selectively generate at least one of a first request and a second request. The first request is to retrieve a selected one of a plurality of sub-groups of data, the first request includes a plurality of keys, and each of the plurality of keys includes a first value identifying the selected one of the plurality of sub-groups and a respective one of a plurality of second values. Each of the plurality of second values identifies a respective subset of data within the selected one of the plurality of sub-groups. The second request is to retrieve a selected one of the subsets of data within the selected one of the plurality of sub-groups of data, the second request includes a key, the key includes the first value and a selected one of the second values, and the selected one of the second values corresponds to a hash value.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

A key-value database may attempt to evenly partition data across a plurality of nodes (i.e., key-value servers) in a key-value cluster. In some examples, a hash function is used on one or more portions of a key. For example, each key-value server may be associated with a range of possible hash values to distribute load across the key-value servers, and the hash function is used to determine where a corresponding data entry is stored. However, the portion of the key that is hashed using the hash function may include components that are not evenly distributed with respect to data volume. In other words, different hash values may correspond to different data volumes. Accordingly, evenly distributing hash values does not necessarily result in evenly distributed data.

Key-value systems and methods according to the principles of the present disclosure selectively allow lookup and retrieval of data according to tenant (e.g., customer) or according to one or more individual users of the tenant. For example, a key may include a primary field corresponding to the tenant and a secondary field appended to the primary field. The secondary field corresponds to an individual user (e.g., a username associated with the tenant). A hash function is applied to the secondary field to index a subset of the individual users to a particular value in the key-value server. Accordingly, in some examples, the key is used to retrieve data of the subset of users indicated by the hashed secondary field. Conversely, in other examples, the key is used to retrieve an entire sub-group of data associated with the tenant. For example, the key-value server may retrieve the entire sub-group of data using the primary field by iterating through a range of hash values of the secondary field.

In this manner, data may be more evenly distributed across a plurality of key-value servers in a key-value cluster. Further, the key may be used to retrieve the entire sub-group of data or only data for a subset of users associated with a single hash value. In some examples, the range of possible hash values may be selected according to whether more even distribution (i.e., a greater range of hash values) or retrieving the requested data with fewer queries (i.e., a smaller range of hash values) is desired.

Figure 1B:
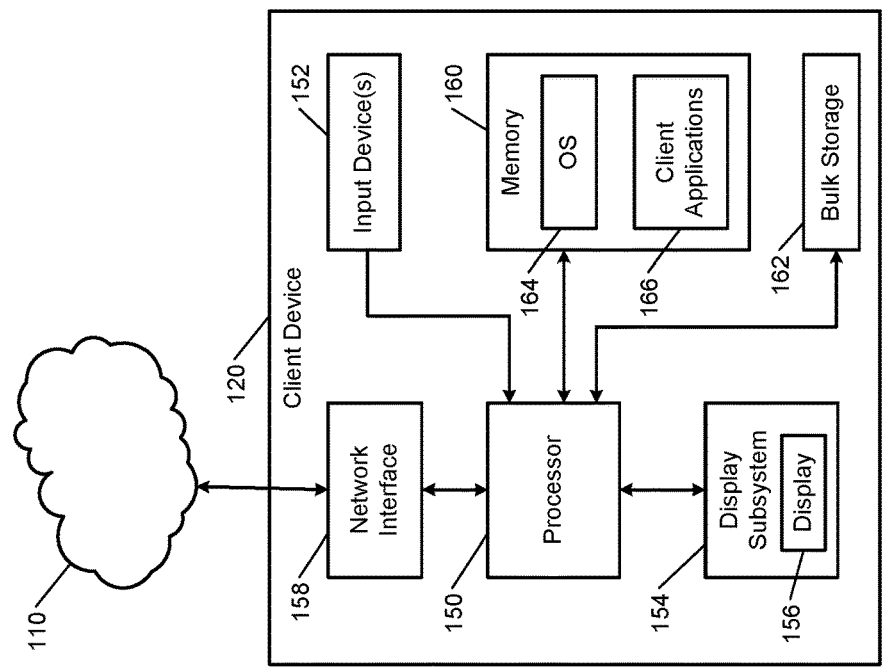
FIG. 1B is an example client device that implements key-value systems and methods according to the principles of the present disclosure.
Figure 1A:
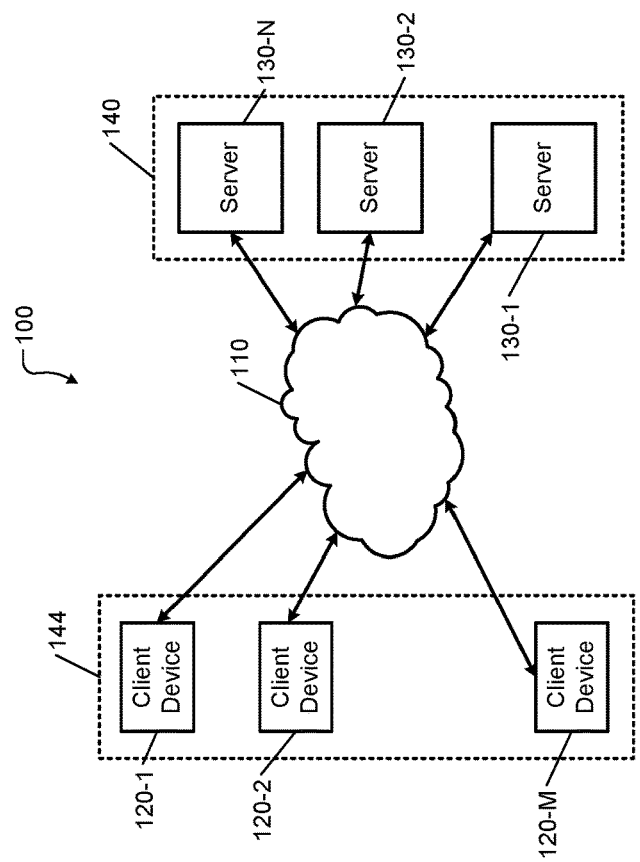
FIG. 1A is an example distributed network system that implements key-value systems and methods according to the principles of the present disclosure.

FIG. 1A shows a simplified example of a distributed network system 100 implementing the key-value systems and methods of the present disclosure. The distributed network system 100 includes a network 110, one or more client devices 120-1, 120-2, . . . , and 120-M (collectively client devices 120), and one or more servers 130-1, 130-2, . . . , and 130-N (collectively servers 130). The network 110 may include a local area network (LAN), a wide area network (WAN) such as the Internet, or other type of network (collectively shown as the network 110). For example, the servers 130 may be located at different departments and different geographical locations of an enterprise (e.g., servers including, but not limited to, cloud-based servers). The client devices 120 communicate with the server 130 via the network 110. The client devices 120 and the server 130 may connect to the network 110 using wireless and/or wired connections to the network 110.

For example, the client devices 120 may include smartphones, personal digital assistants (PDAs), laptop computers, personal computers (PCs), and so on. The server 130 may provide multiple services to the client devices 120. For example, the server 130 may execute a plurality of software applications developed by one or more vendors. The server 130 may host multiple databases that are utilized by the plurality of software applications and that are used by users of the client devices 120.

The client devices 120 and the servers 130 implement key-value data storage and retrieval. For example, two or more of the servers 130 may correspond to key-value servers in a key-value cluster (i.e., a storage cluster) 140, and two or more of the client devices 120 may correspond to individual users of a tenant 144 or, in some examples, front-end applications used by the tenant 144. One or more of the client devices 120 may execute applications that write data to the key-value cluster 140 in accordance with a key including a primary field and a hashed secondary field. Others of the client devices 120 execute applications that retrieve data from the key-value cluster 140 in accordance with the key. For example, the key-value cluster 140 is configured to selectively retrieve an entire sub-group of data of the tenant 144 associated with the primary field of the key and/or retrieve only data of a subset of users of the tenant 144 associated with the hashed secondary field as described below in more detail.

FIG. 1B shows a simplified example of the client device 120. The client device 120 may typically include a central processing unit (CPU) or processor 150, one or more input devices 152 (e.g., a keypad, touchpad, mouse, and so on), a display subsystem 154 including a display 156, a network interface 158, a memory 160, and a bulk storage 162.

The network interface 158 connects the client device 120 to the distributed network system 100 via the network 110. For example, the network interface 158 may include a wired interface (e.g., an Ethernet interface) and/or a wireless interface (e.g., a Wi-Fi, Bluetooth, near field communication (NFC), or other wireless interface). The memory 160 may include volatile or nonvolatile memory, cache, or other type of memory. The bulk storage 162 may include flash memory, a hard disk drive (HDD), or other bulk storage device.

The processor 150 of the client device 120 executes an operating system (OS) 164 and one or more client applications 166. The client applications 166 include an application to connect the client device 120 to the server 130 via the network 110. The client device 120 accesses one or more applications executed by the server 130 via the network 110. The processor 150 in combination with one or more of the client applications 166, the network interface 158, etc. implements the key-value systems and methods of the present disclosure. For example, the client device 120 selectively writes data to the servers 130 and/or retrieves data from the servers 130 in accordance with a key-value store as described below in more detail.

Figure 1C:
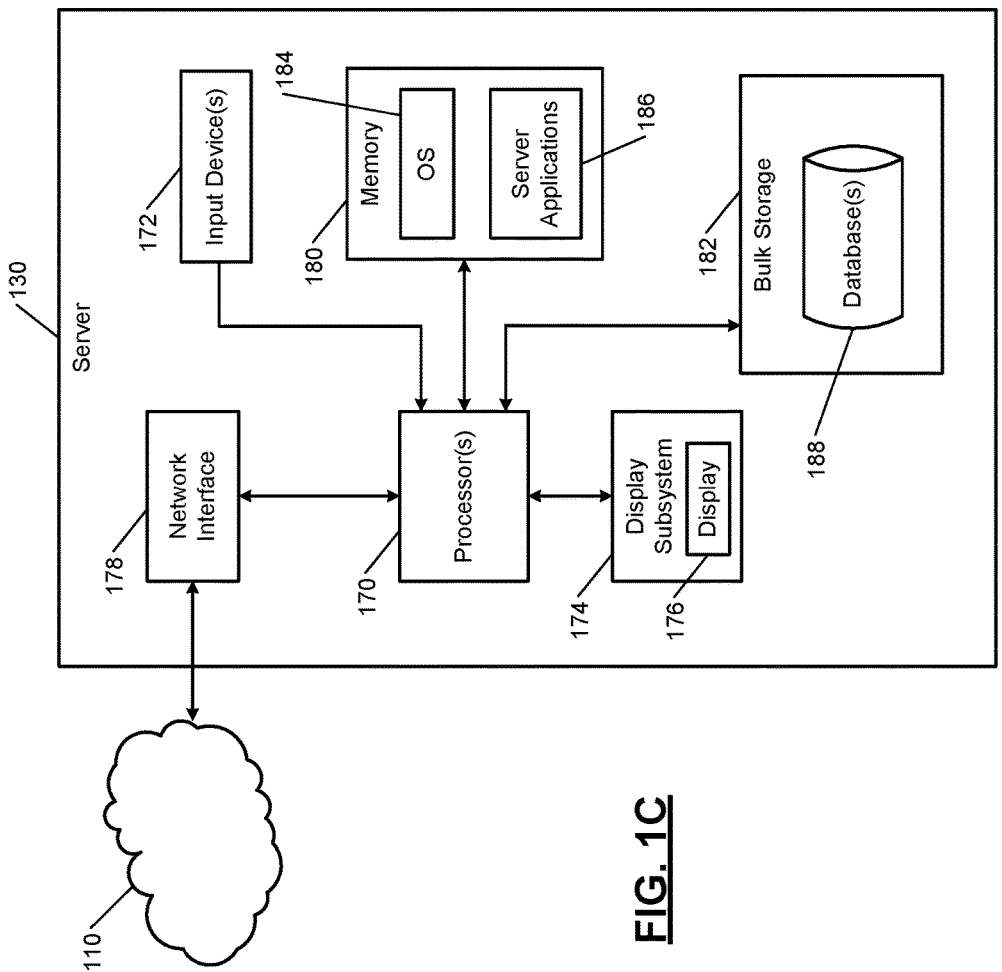
FIG. 1C is an example server that implements key-value systems and methods according to the principles of the present disclosure.

FIG. 1C shows a simplified example of the server 130. The server 130 typically includes one or more CPUs or processors 170, one or more input devices 172 (e.g., a keypad, touchpad, mouse, and so on), a display subsystem 174 including a display 176, a network interface 178, a memory 180, and a bulk storage 182.

The network interface 178 connects the server 130 to the distributed network system 100 via the network 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more hard disk drives (HDDs), or other bulk storage device.

The processor 170 of the server 130 executes an operating system (OS) 184 and one or more server applications 186, which may include the key-value systems and methods of the present disclosure. The bulk storage 182 may store one or more databases 188 that store data structures used by the server applications 186 to perform respective functions.

Figure 2:
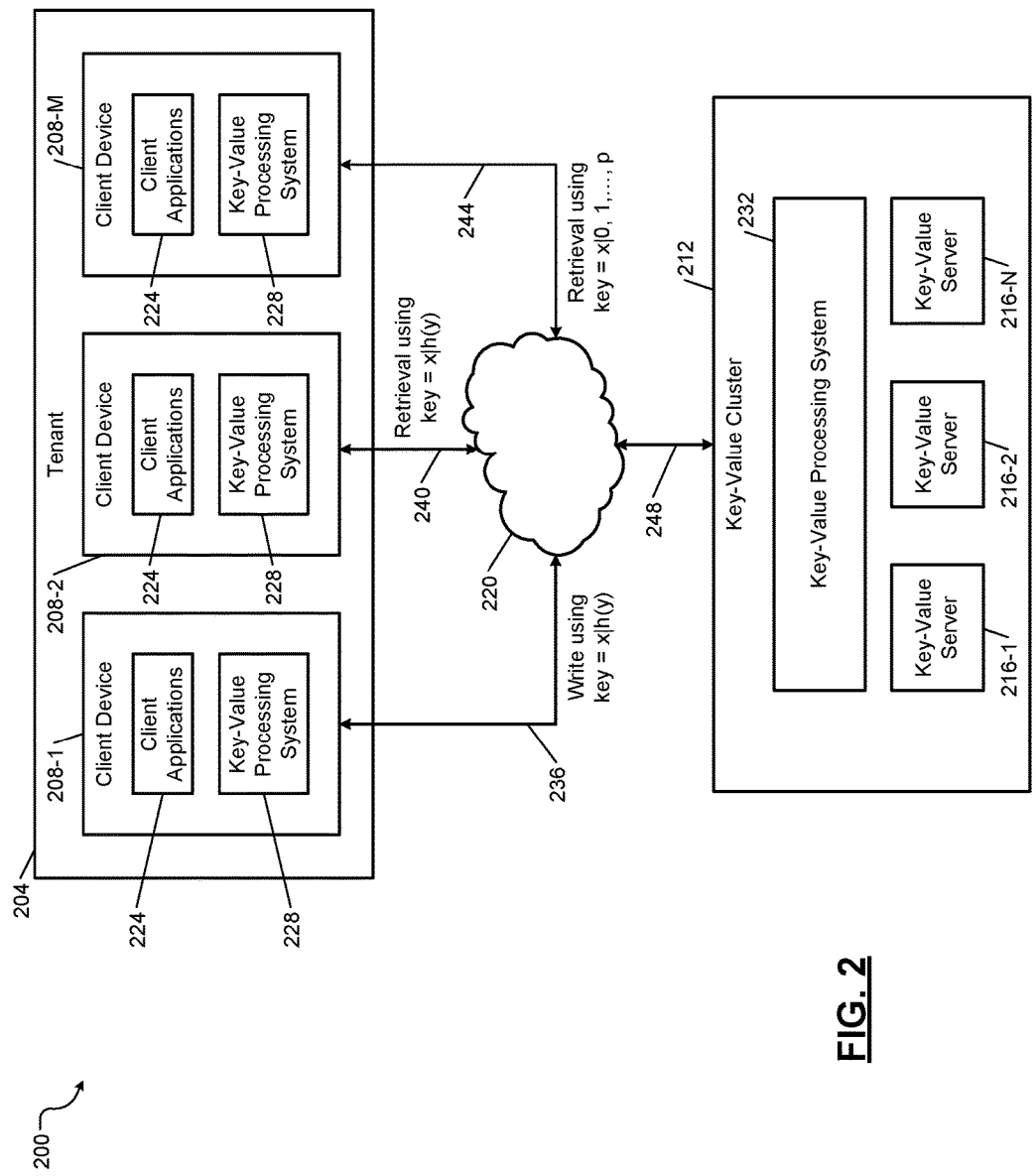
FIG. 2 is an example key-value storage system according to the principles of the present disclosure.

FIG. 2 shows an example key-value storage system 200 according to the present disclosure. The key-value storage system 200 includes a tenant 204 and associated client devices 204-1, 204-2, . . . , and 204-M (collectively client devices 204). The client devices 204 write data to and retrieve data from a key-value cluster 212 including key-value servers 216-1, 216-2, . . . , and 216-N (collectively key-value servers 216). The client devices 204 communicate with the key-value cluster 212 via network 220. Although not shown, the tenant 204 may be one of a plurality of tenants configured to access the key-value cluster 212.

The client devices 204 may implement any of the components of the client device 120 described in FIG. 1B but are simplified in FIG. 2 for example purposes. For example, each of the client devices 204 may execute one or more client applications 224 and may include a respective key-value processing system 228 (e.g., as implemented using the processor 150, the memory 160 and corresponding applications, etc.) as described below in more detail. Similarly, the key-value cluster 212 and/or the key-value servers 216 may implement any of the components of the server 130 described in FIG. 1C but are simplified in FIG. 2 for example purposes. For example, the key-value cluster 212 may include a key-value processing system 232 (e.g., as implemented using the processor 170, the memory 180 and corresponding applications, etc.) as described below in more detail. For example only, the key-value processing system 232 of the key-value cluster 212 may be implemented within one of the key-value servers 216, a separate server, a machine in a same geographic location as the key-value servers 216 (e.g., in a dedicated machine in a rack or same physical locations as the key-value servers 216), etc. In some examples, each of the key-value servers 216 may implement a respective key-value processing system 232.

One or more of the client devices 208 is configured to store (i.e., write) data to the key-value cluster 212. Data is stored to the key-value cluster 212 using a key configured according to the principles of the present disclosure. For example, the client device 208-1 may generate a write request to store data to the key-value cluster 212. The key-value processing system 228 of the client device 208-1 generates a key 236 corresponding to the write request. The key 236 includes a primary field x and a secondary field h(y), where x identifies the tenant 204, y identifies a user (e.g., the client device 208-1) associated with the tenant 204, and h(y) corresponds to a hashed value of y. For example, the key-value processing system 228 applies a hash function to y to obtain the hashed secondary field h(y). The key-value cluster 212 stores the data associated with the write request to one of the key-value servers 216 according to the key 236.

One or more of the client devices 208 may also be configured to retrieve data from the key-value cluster 212 according to a key 240 or keys 244. For example only the client device 208-2 generates a read request (e.g., a query) to retrieve data associated with a particular user. Accordingly, the key-value processing system 228 of the client device 208-2 generates the key 240 including the primary field x and the secondary field h(y), where y identifies the user of the client device 208-2. For example, the key-value processing system 228 of the client device 208-2 applies a hash function to y to obtain the hashed secondary field h(y). The key-value cluster 212 retrieves the data of the client device 208-2 associated with the read request according to the key 240.

Conversely, the client device 208-M generates a plurality (e.g., p, where p corresponds to a hash range of the hash function h(y)) of read requests (i.e., queries) to retrieve an entire sub-group of data associated with the tenant 204. Accordingly, the key-value processing system 228 of the client device 208-M generates p keys 244 including the primary field x and a secondary field indicating one of an entire range of hash values (e.g., 0, 1, . . . , p) corresponding to the tenant 204. The key-value cluster 212 retrieves the entire sub-group of data of the tenant 204 associated with the read request according to the keys 244.

In some examples, the key-value processing system 232 of the key-value cluster 212 may be configured to direct a received request 248 to a respective one of the key-value servers 216. For example, each of the key-value servers 216 may store a different portion of the data of a plurality of tenants, including the tenant 204. Accordingly, the key-value processing system 232 may store data (e.g., a log or table) associating the tenants with one or more of the key-value servers 216, associating each key with a particular one of the key-value servers 216, etc. In other examples, each of the key-value servers 216 may receive every request 248.

Figure 3:
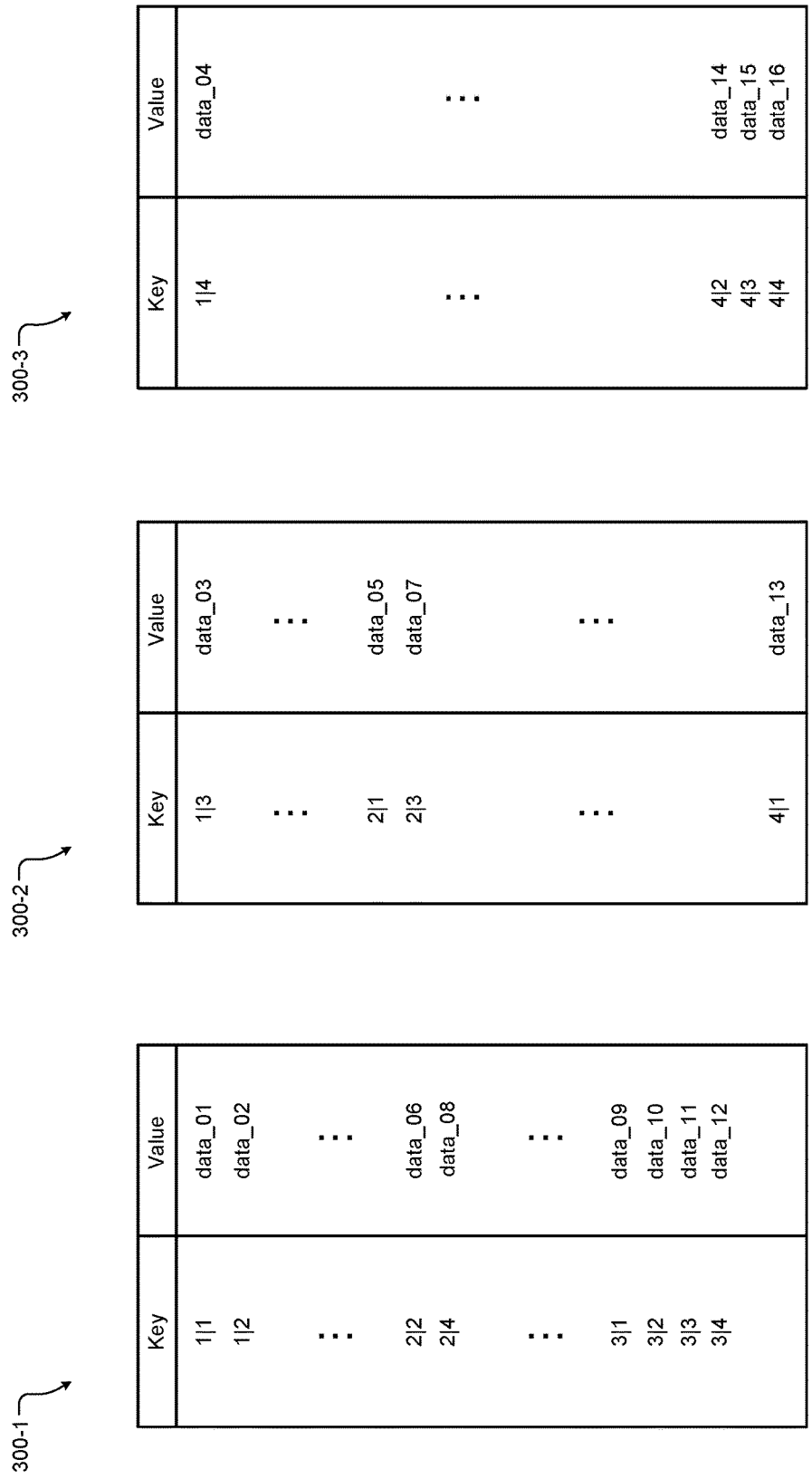
FIG. 3 is an example key-value table according to the principles of the present disclosure.

In an example where a number N of the key-value servers 216 N is 3, each of the servers 216 stores and retrieves data according to example key-value tables (e.g., a hash table) 300-1, 300-2, . . . , and 300-3, respectively (collectively key-value tables 300) as shown in FIG. 3. The tables 300 represent data stored as key-value pair objects. For example, the servers 216 each store, in non-volatile memory, a respective portion of the data of tenants as key-value pairs. For simplicity, FIG. 3 illustrates example storage of data for only four tenants (1-4), each having four users (1-4) for a total of sixteen data entries (data_01 through data_16). In other words, a key structure x|h(y) for four tenants and a hash range of four maps to four sub-groups of tenant data and a total of sixteen data entries. However, a key-value cluster such as the key-value cluster 212 may include hundreds of the key-value servers 216 configured to store data for hundreds or thousands of the tenants 204 and hundreds of thousands of users.

Each of the keys includes a primary field (e.g., 1, 2, 3, or 4) identifying a tenant and a secondary field (e.g., 1, 2, 3, or 4) corresponding to a hashed value identifying a specific user. For example, the hashed value may correspond to a hashed username, such as a login name or email address of the user (e.g., username@domain.com). In other words, the hash function is applied to the username to calculate the secondary field of the key. In the present example, each username for a tenant hashes to a unique hash value 1-4. In other examples as described below in more detail, multiple usernames may hash to a same hash value. In other words, the hash range p may be less than a total number of users of a tenant.

For example, the key-value table 300-1 stores data corresponding to keys 1|1, 1|2, 2|2, 2|4, 3|1, 3|2, 3β, and 3|4, the key-value table 300-2 stores data corresponding to keys 1|3, 2|1, 2|3, and 4|1, and the key-value table 300-3 stores data corresponding to keys 1|4, 4|2, 4|3, and 4|4. Accordingly, a sub-group of data corresponding to each of the tenants 1-4 may be portioned across different ones of the servers 216. For example, the table 300-1 may store all of the data of tenant 1, only a portion of the data of tenants 1 and 2, and none of the data of the tenant 4. Conversely, the table 300-2 stores only a portion of the data of each of tenants 1, 2, and 4, and none of the data of tenant 3. The table 300-3 stores portions of the data of tenants 1 and 4 and none of the data of tenants 2 and 3.

Accordingly, rather than distributing data across the servers 216 based on an even distribution of tenants and/or data entries (i.e., hash values, usernames, etc.), the data is instead distributed based on an even distribution of data. In other words, while the table 300-1 stores a greater number of key-value pairs (i.e., data entries) than the tables 300-2 or 300-3, the overall amount of data stored by each of the tables 300 may be more evenly distributed. For example, the data entries corresponding to tenant 3 (data_09 through data_12) may include an overall smaller amount of data than the data entry for key 411 (data_13).

In this manner, data may be more evenly distributed across the key-value servers 216 by allowing the sub-group of data of the tenant 204 to be distributed across multiple ones of the servers 216 without duplicating the data. Further, the entire sub-group of data for the tenant 204 may be retrieved by providing the keys 244 corresponding to all of the users (i.e., client devices 208) of the tenant 204 to the key-value cluster 212, and data corresponding to only a single user or subset of users may be retrieved by providing the key 240 including a hash value as described above.

The hash range p may be selected to balance distribution of data with a number queries required to retrieve the entire sub-group of data of the tenant 204. For example, a larger hash range results in a more even distribution of data across the servers 216 but requires a greater number of queries (e.g., equal to the hash range p) to retrieve all of the data entries of the tenant 204. Conversely, a lower hash range results in a less even distribution of the data, but a smaller number of queries to retrieve all of the data entries of the tenant 204.

In one example where the hash range p is selected to be 8191, retrieving the entire sub-group of data for the tenant 204 would require 8192 queries (including keys x|0 through x|8191). If the total number of usernames is less than 8192, then each username could be hashed to a unique hash value and a data entry corresponding to a single user could be retrieved with each key. However, if the total number of usernames is significantly greater than 8192 (e.g., 100,000), then multiple usernames would hash to each hash value and a query for a single user would retrieve data associated with multiple usernames. The requesting client device would then filter the retrieved data to select only the data of the associated username. Further, achieving a more even distribution across the servers 216 would be more difficult since multiple usernames hashing to the same hash value could result in different hash values being paired with significantly different volumes of data.

Conversely, increasing the hash range p (e.g., to 65535) would increase the number of queries required to retrieve the entire sub-group of data for the tenant 204, but decrease the number of usernames associated with the same hash value. For example, using the example of 100,000 usernames, each hash value may be associated with only one or two usernames, on average. However, distribution of usernames may not necessarily be even across the hash values and, in some examples, more than two usernames may be associated with some hash values while only one username is associated with other hash values. Accordingly, increasing the hash range p would result in a more even distribution of the data of the 100,000 users across the servers 216 while requiring significantly more queries to retrieve all of the data of the tenant 204.

Figure 4:
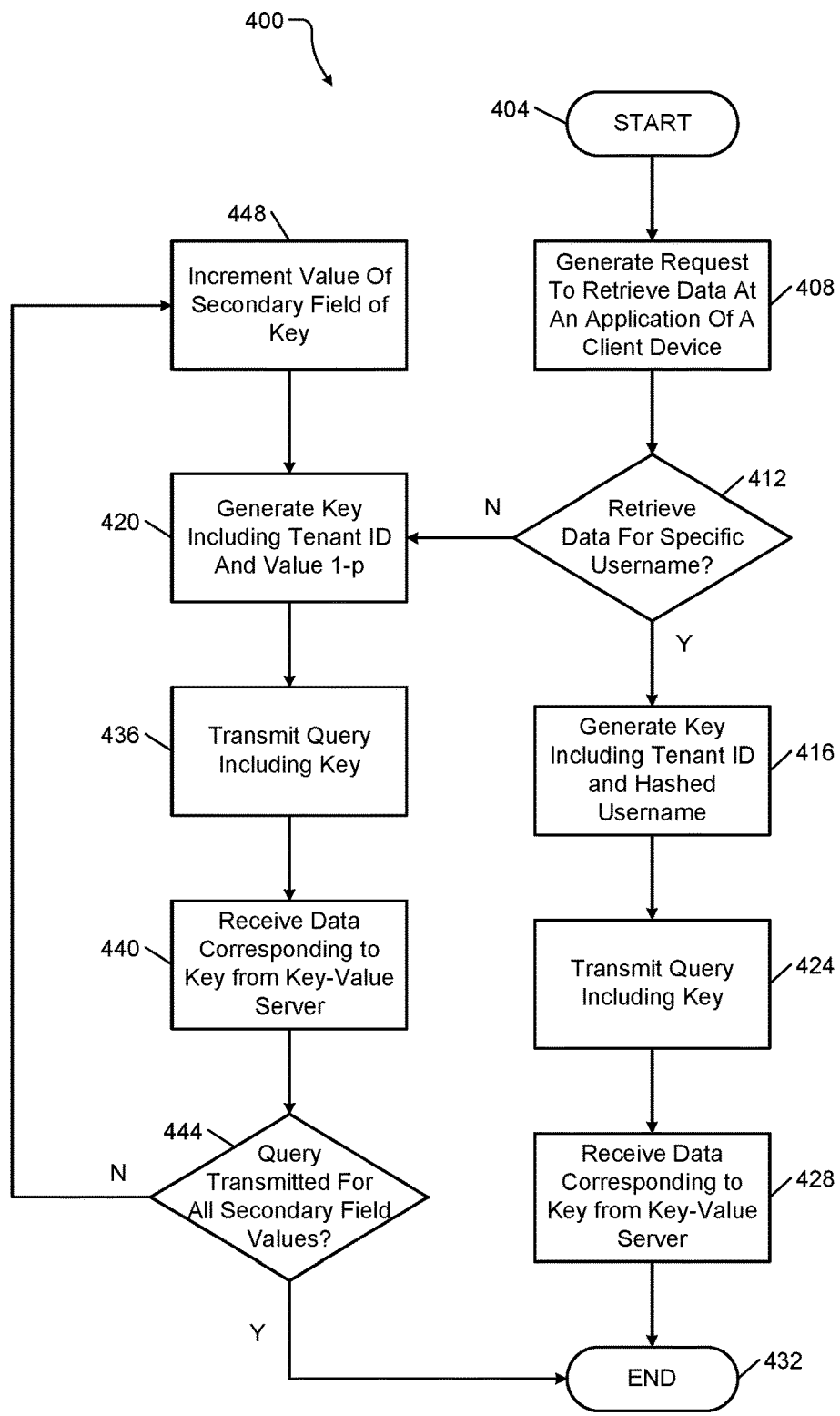
FIG. 4 is an example key-value lookup method according to the principles of the present disclosure.

FIG. 4 shows an example key-value lookup method 400 beginning at 404. At 408, the method (e.g., a client application 224 of one of the client devices 216) generates a request to retrieve data. At 412, the method 400 (e.g., the key-value processing system 228) determines whether to retrieve data associated with a specific username (e.g., as opposed to an entire sub-group of data of the tenant 204). If true, the method 400 continues to 416. If false, the method 400 continues to 420. At 416, the method 400 (e.g., the key-value processing system 228) generates a key corresponding to the requested data. For example, the key may include a primary field including a tenant identifier (e.g., x) and a secondary field including hash value h(y), where y corresponds to the username. At 424, the method 400 (e.g., the key-value processing system 228) transmits a query including the key to the key-value cluster 212. At 428, the method 400 (e.g., the client device 216) receives the data corresponding to the key included with the query. The method 400 ends at 432.

At 420, the method 400 (e.g., the key-value processing system 228) generates a key corresponding to the requested data. For example, the key may include a primary field including a tenant identifier (e.g., x) and a secondary field including a value 1-p, where p is a hash range associated with the data stored for the client device 216. At 436, the method 400 (e.g., the key-value processing system 228) transmits a query including the key to the key-value cluster 212. At 440, the method 400 (e.g., the client device 216) receives the data corresponding to the key included with the query.

At 444, the method 400 (e.g., the key-value processing system 228) determines whether a query was transmitted for all possible values of the secondary field of the key associated with the client device 216. If true, the method 400 ends at 432. If false, the method 400 continues to 448. At 448, the method 400 (e.g., the key-value processing system 228) increments the value of the secondary field and generates a corresponding key at 420. In this manner, the method 400 cycles through all possible values in the hash range p to generate p queries and retrieve the entire sub-group of data of the tenant 204.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A data storage and retrieval system comprising:
one or more tenants each comprising a plurality of client devices;
a cluster of servers each storing data, and wherein the plurality of client devices are connectable through a network to the cluster, the plurality of client devices writing data to and retrieving data from the servers in the cluster;
wherein the plurality of client devices each access a key-value processing system configured to perform at least the following:
generate a write key that comprises a primary field x and a hashed secondary field h(y), where x identifies a given tenant, and y identifies a given user of one of the client devices of the given tenant, and h(y) corresponds to a hashed value of y;
associate the write key with a write request for data to be stored at one or more of the servers of the cluster; and
transmit the write request to a key-value processing system of the cluster, wherein the key-value processing system of the cluster is configured to distribute write data received from the plurality of client devices among the servers of the cluster based on the write key associated with each write request, and wherein the write key is used to facilitate distribution of the write data across the servers of the cluster based on an essentially even distribution of the write data rather than distributing the write data across the servers based on an even distribution of tenants.

2. The data storage and retrieval system as defined in claim 1, wherein the key-value processing system accessed by the plurality of client devices further performs the following:
generates a first read key that comprises a primary field x and a hashed secondary field h(y), where x identifies a given tenant, and y identifies a given user of one of the client devices of the given tenant, and h(y) corresponds to a hashed value of y;
associates the first read key with a read request for data to be retrieved from the cluster, wherein the data to be retrieved is associated with the first read key, such that the data to be retrieved is associated with the given user identified in the secondary field of the first read key; and
transmits the read request to the key-value processing system of the cluster, and wherein the key-value processing system of the cluster is configured to retrieve and return the requested data that is associated with the given user based on the secondary field of the first read key.

3. The data storage and retrieval system as defined in claim 2, wherein the key-value processing system of the plurality of client systems further performs the following:
generates a plurality of second read keys that each comprise the field x and a secondary field that is based on a value within a hash range p of the hash h(y), where the value for each second key comprises one value 0, 1, . . . , p within the hash range p;
associates each second read key with one of a plurality of read requests for data to be retrieved from the cluster, wherein the data to be retrieved is associated with one of the second read keys, such that the data to be retrieved for the plurality of read requests represents an entire sub-group of data associated with the given tenant identified in the primary field of the second read keys; and
transmits the plurality of read requests to the key-value processing system of the cluster, and wherein the key-value processing system of the cluster is configured to use each of the second read keys to retrieve and return to the given user of the given tenant the requested data.

4. The data storage and retrieval system as defined in claim 3, wherein the hash range p is selected to balance distribution of data with a number of queries required to retrieve the entire sub-group of data for the given tenant.

5. The data storage and retrieval system as defined in claim 4, wherein a larger hash range p results in a more even distribution of data across the servers of the given cluster, but requires a number of queries equal to the larger hash range to retrieve all of the entire sub-group of data for the given client, and a lower hash range results in a less even distribution of data, but a smaller number of queries to retrieve the entire sub-group of data.

6. The data storage and retrieval system as defined in claim 1, wherein the key-value processing system of the cluster stores a table for each server, and wherein each table identifies each instance of data stored at the server associated with that table, and wherein each table further identifies a write key associated with instance of the stored data.

7. The data storage and retrieval system as defined in claim 6, wherein the write keys are used to create an even distribution of data among the tables irrespective of whether the tenants are evenly distributed among the tables, which in turn facilitates distribution of the write data across the servers of the cluster based on an essentially even distribution of the data rather than distributing data across the servers based on an even distribution of tenants.

8. A computer-implemented method for data storage and retrieval system comprising:
for one or more tenants each comprising a plurality of client devices, providing the plurality of client devices with access to a key-value processing system configured to perform the following:
generate a write key that comprises a primary field x and a hashed secondary field h(y), where x identifies a given tenant, and y identifies a given user of one of the plurality of client devices of the given tenant, and h(y) corresponds to a hashed value of y;
associate the write key with a write request for storing data at one or more servers of a cluster; and
transmit the write request to the cluster of one or more servers; and
provide the one or more servers with access to a key-value processing system at the cluster, wherein the key-value processing system at the cluster is configured to distribute write data received from the plurality of client devices among the one or more servers of the cluster based on the write key associated with each write request, and wherein the write key is used to facilitate distribution of the write data across the one or more servers of the cluster based on an essentially even distribution of the write data rather than distributing the write data across the one or more servers based on an even distribution of tenants.

9. The computer-implemented method as defined in claim 8, wherein the key-value processing system accessed by the plurality of client systems further performs the following:

generates a first read key that comprises a primary field x and a hashed secondary field h(y), where x identifies a given tenant, and y identifies a given user of one of the client devices of the given tenant, and h(y) corresponds to a hashed value of y;

associates the first read key with a read request for data to be retrieved from the cluster, wherein the data to be retrieved is associated with the first read key, such that the data to be retrieved is associated with the given user identified in the secondary field of the first read key; and transmits the read request to the key-value processing system of the cluster, and wherein the key-value processing system of the cluster is configured to retrieve and return the requested data that is associated with the given user based on the secondary field of the first read key.

10. The computer-implemented method as defined in claim 9, wherein the key-value processing system of the plurality of client systems further performs the following:

generates a plurality of second read keys that each comprise the primary field x and a secondary field that is based on a value within a hash range p of the hash h(y), where the value for each second key comprises one value 0, 1, . . . , p within the hash range p;

associates each second read key with each one of a plurality of read requests for data to be retrieved from the cluster, wherein the data to be retrieved is associated with the second read keys, such that the data to be retrieved for the plurality of read requests represents an entire sub-group of data associated with the given tenant identified in the primary field of the second read keys; and transmits the plurality of read requests to the key-value processing system of the cluster, and wherein the key-value processing system of the cluster is configured to use each of the second read keys to retrieve and return to the given user of the given tenant the requested data that represents the entire sub-group of data.

11. The computer-implemented method as defined in claim 10, wherein the hash range p is selected to balance distribution of data with a number of queries required to retrieve the entire sub-group of data for the given tenant.

12. The computer-implemented method as defined in claim 11, wherein a larger hash range p results in a more even distribution of data across the servers of the given cluster, but requires a number of queries equal to the larger hash range to retrieve all of the entire sub-group of data for the given client, and a lower hash range results in a less even distribution of data, but a smaller number of queries to retrieve the entire sub-group of data.

13. The computer-implemented method as defined in claim 8, wherein the key-value processing system of the cluster stores a table for each server, and wherein each table identifies each instance of data stored at the server associated with that table, and wherein each table further identifies a write key associated with instance of the stored data.

14. The computer-implemented method as defined in claim 13, wherein the write keys are used to create an even distribution of data among the tables irrespective of whether the tenants are evenly distributed among the tables, which in turn facilitates distribution of the write data across the servers of the cluster based on an essentially even distribution of the data rather than distributing data across the servers based on an even distribution of tenants.

15. A data storage and retrieval system comprising:
one or more tenants each comprising a plurality of client devices;
a cluster of servers each storing data, wherein the plurality of client devices are connectable through a network to the cluster, the plurality of client devices writing data to and retrieving data from the servers;
wherein the plurality of client devices each access a key-value processing system configured to perform the following:
generate a write key that comprises a primary field x and a hashed secondary field h(y), where x identifies a given tenant, and y identifies a given user of one of the client devices of the given tenant, and h(y) corresponds to a hashed value of y;
associate the write key with a write request for data to be stored at one or more of the servers of the cluster;
generate a first read key that comprises a primary field x and a hashed secondary field h(y), where x identifies a given tenant, and y identifies a given user of one of the client devices of the given tenant, and h(y) corresponds to a hashed value of y;
associate the first read key with a read request for data to be retrieved from the cluster, wherein the data to be retrieved is associated with the first read key, such that the data to be retrieved is associated with the given user identified in the secondary field of the first read key;
generate a plurality of second read keys that each comprise the primary field x and a secondary field that is based on a value within a hash range p of the hash h(y), where the value for each second key comprises one value 0, 1, . . . , p within the hash range p;
associate each second read key with each one of a plurality of read requests for data to be retrieved from the cluster, wherein the data to be retrieved is associated with the second read keys, such that the data to be retrieved for the plurality of read requests represents an entire sub-group of data associated with the given tenant identified in the primary field of the second read keys; and
wherein the cluster of servers comprises a key-value processing system configured to perform the following:
receive the write request and distribute write data received from the plurality of client devices among the servers of the cluster based on the write key associated with each write request, and wherein the write keys are used to facilitate distribution of the write data across the servers of the cluster based on an essentially even distribution of the write data rather than distributing the write data across the servers based on an even distribution of tenants; and
receive the read request and return the requested data that is associated with the given user based on either (i) the secondary field of the first read key, such that the requested data that is returned is associated with the given user based on the secondary field, or based on (ii) each of the second read keys such that the requested data that is returned represents the entire sub-group of data for the given tenant.

16. The data storage and retrieval system as defined in claim 15, wherein the hash range p is selected to balance distribution of data with a number of queries required to retrieve the entire sub-group of data for the given tenant.

17. The data storage and retrieval system as defined in claim 16, wherein a larger hash range p results in a more even distribution of data across the servers of the given cluster, but requires a number of queries equal to the larger hash range to retrieve all of the entire sub-group of data for the given client, and a lower hash range results in a less even distribution of data, but a smaller number of queries to retrieve the entire sub-group of data.

18. The data storage and retrieval system as defined in claim 15, wherein the key-value processing system of the cluster stores a table for each server, and wherein each table identifies each instance of data stored at the server associated with that table, and wherein each table further identifies a write key associated with instance of the stored data.

19. The data storage and retrieval system as defined in claim 18, wherein the write keys are used to create an even distribution of data among the tables irrespective of whether the tenants are evenly distributed among the tables, which in turn facilitates distribution of the write data across the servers of the cluster based on an essentially even distribution of the data rather than distributing data across the servers based on an even distribution of tenants.

* * * * *